US009391905B2

(12) United States Patent
Zhang et al.

(10) Patent No.: US 9,391,905 B2
(45) Date of Patent: *Jul. 12, 2016

(54) METHOD AND SYSTEM OF BANDWIDTH-AWARE SERVICE PLACEMENT FOR SERVICE CHAINING BASED ON BANDWIDTH CONSUMPTION IN A SOFTWARE-DEFINED NETWORKING (SDN) SYSTEM

(71) Applicant: Telefonaktiebolaget L M Ericsson (publ), Stockholm (SE)

(72) Inventors: Ying Zhang, San Jose, CA (US); Neda Beheshti-Zavareh, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,367

(22) Filed: Aug. 5, 2015

(65) Prior Publication Data

US 2015/0341276 A1 Nov. 26, 2015

Related U.S. Application Data

(63) Continuation of application No. 13/904,539, filed on May 29, 2013, now Pat. No. 9,137,161.

(51) Int. Cl.
*H04L 12/851* (2013.01)
*H04L 12/801* (2013.01)
(Continued)

(52) U.S. Cl.
CPC ........ *H04L 47/2408* (2013.01); *H04L 41/0896* (2013.01); *H04L 41/5041* (2013.01); *H04L 43/0882* (2013.01); *H04L 47/10* (2013.01); *H04L 41/12* (2013.01)

(58) Field of Classification Search
CPC .................................................. H04L 41/5041
See application file for complete search history.

(56) References Cited

U.S. PATENT DOCUMENTS

| 8,756,639 | B2 * | 6/2014 | Russell | H04L 12/2861 370/238 |
| 2006/0084432 | A1 | 4/2006 | Balasubramanian et al. | |
| 2007/0299789 | A1 * | 12/2007 | Young | G06Q 30/02 705/400 |

(Continued)

OTHER PUBLICATIONS

Li et al. (Mosaic: Policy Homomorphic Network Extension), pp. 14.*

(Continued)

*Primary Examiner* — Ian N Moore
*Assistant Examiner* — Mewale Ambaye
(74) *Attorney, Agent, or Firm* — Nicholson De Vos Webster & Elliott LLP

(57) ABSTRACT

A method implemented in a network for placing services in a SDN system is disclosed. The network contains a plurality of network devices managed by a SDN controller and offers a set of services to subscribers. Subsets of the set of services are included in ordered service chains for subscribers. The method starts with determining a list of bandwidth consumption entities of a service for each service, where each bandwidth consumption entity is based on one or more chains of services. Then a weight of each service is calculated based on the list of bandwidth consumption entities of the service and a service with the highest weight within a group of services that have not been placed in the SDN system is selected. The selected service is then placed at a network device based at least partially on calculating bandwidth impacts to the SDN system by the service.

19 Claims, 10 Drawing Sheets

(51) Int. Cl.
H04L 12/26 (2006.01)
H04L 12/24 (2006.01)

(56) References Cited

U.S. PATENT DOCUMENTS

| | | | |
|---|---|---|---|
| 2009/0164583 | A1 | 6/2009 | Zhu |
| 2013/0290955 | A1 | 10/2013 | Turner et al. |
| 2015/0106526 | A1 | 4/2015 | Arndt |

OTHER PUBLICATIONS

"Open Flow Switch Specification", Version 1.1.0 Implemented (Wire Protocol 0x02), Feb. 28, 2011, pp. 1-56.
Joseph, Dilip A., et al., "A Policy-aware Switching Layer for Data Centers", SIGCOMM'08, Aug. 17-22, 2008, 12 pages, Seattle, USA.
McKeown, Nick, et al., "OpenFlow: Enabling Innovation in Campus Networks", Mar. 14, 2008, 6 pages.
Montreal, Geoffrey L., et al. "Chaining of Inline Services Using Software Defined Networking", U.S. Appl. No. 13/556,456, filed Jul. 24, 2012, 43 pages.
Zhang, Ying, et al., "Method and Apparatus for Placing Services in a Network", U.S. Appl. No. 13/751,826, filed Jan. 28, 2013, 28 pages.
Li, Erran et al., "Mosaic: Policy Homomorphic Network Extension", Lux Et Veritas, Yale University Department of Computer Science, May 13, 2010, 15 pages.
Zhang et al., "StEERING: A Software-Defined Networking for Inline Service Chaining", 2013 21st IEEE International Conference on Network Protocols (ICNP), IEEE, Oct. 7, 2013, pp. 1-10.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 Pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al. "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffServ Service Classes," Aug. 2006, 57 pages, Network Working Group, Request for Comments: 4594, The Internet Society.
L. Andersson, et al., "LDP Specification," Oct. 2007, 135 pages, Network Working Group, Request for Comments: 5036, The IETF Trust.

(56) References Cited

OTHER PUBLICATIONS

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

* cited by examiner

Subscriber Bandwidth Requests

R1 = IN1, S1, S2, S3, OUT1; CF1 = 10M

R2 = IN1, S1, S3, OUT1; CF2 = 20M

R3 = IN1, S2, S1, OUT2; CF3 = 20M

R4 = IN1, S3, S1, OUT2; CF4 = 10M

FIG. 4A

Inter-Service Bandwidth Requests (INTERBW) For S1

S1 → S2: 10M
S1 → S3: 20M
S1 → OUT2: 20M
S1 → OUT2: 10M
IN1 → S1: 10M
IN1 → S1: 20M
S2 → S1: 20M
S3 → S1: 10M

FIG. 4B

Weights For All Services

Bandwidth Impact Of S1 At Each Nodes In The Network

```
procedure Bandwidth_Based_Placement(G,S,R)
    UnPlaced=S;
    for each subscriber's request r_k ∈ R do                                    ← 902
        for each consecutive node pair (s_i, s_j) in r_k do
            INTERBW[s_i][s_j]+ = BW_{r_k}
            INTERBW[s_j][s_i]+ = BW_{r_k}
        end for
    end for
    while UnPlaced ≠ ∅ do                                                       ← 904
        for each service s_i ∈ S do
            Compute WEIGHT[s_i] = Σ_j INTERBW[s_i][j]
        end for
        Find s_curr with largest WEIGHT value
        for each service j, j ≠ curr do                                         ← 906
            RATIO_U[j] = INTERBW[s_curr][j]
            RATIO_P[j] = INTERBW[s_curr][j]
        end for
        RATIO = RATIO_U ∪ RATIO_P
        for all node v ∈ V do
            for all placed node u of s_curr do
                DIFF_v = Σ_k | d(u,v) / Σ_w d(u,w) − RATIO[u] |
                if d(u,v) > D then
                    next
                end if
                if AVAILABLE_BW(u,v) < B_v then
                    next
                end if
            end for
            Find u with smallest DIFF_u
        end for
        UnPlaced = UnPlaced − (s_curr)                                          ← 908
    end while
```

FIG. 9

METHOD AND SYSTEM OF BANDWIDTH-AWARE SERVICE PLACEMENT FOR SERVICE CHAINING BASED ON BANDWIDTH CONSUMPTION IN A SOFTWARE-DEFINED NETWORKING (SDN) SYSTEM

RELATED APPLICATION

This application claims priority to U.S. patent application Ser. No. 13/904,539, filed on May 29, 2013, now issued as U.S. Pat. No. 9,137,161. This application is related to U.S. patent application Ser. No. 14/099,401, entitled "A Method and System of Service Placement for Service Chaining," filed on Dec. 6, 2013, which is incorporated by reference herein in its entirety.

FIELD OF INVENTION

The embodiments of the invention are related to the field of networking. More specifically, the embodiments of the invention relate to a method and system of bandwidth-aware service placement for service chaining in a network.

BACKGROUND

Operators use different middlebox services or appliances, called inline services, such as deep packet inspection (DPI), logging/metering/charging/advanced charging, firewall (FW), virus scanning (VS), Intrusion Detection and Prevention (IDP), network address translation (NAT), etc., to manage subscribers' traffic. These services have high requirements on throughput and packet inspection capabilities. They can be transparent or nontransparent to the end users. Inline services can be hosted in dedicated physical hardware, or in virtual machines.

Service chaining is required if the traffic needs to go through more than one inline service. Moreover, if more than one chain of services is possible, then the operator needs to configure the networking infrastructure to direct the right traffic through the right inline service path. In this specification, traffic steering refers to leading the traffic through the right inline service path.

There have been some efforts to determine how to steer traffic to provide inline service chaining. The mechanisms developed through those efforts generally are designed to explicitly insert the inline services on the path between endpoints, or explicitly route traffic through different middleboxes according to policies. These mechanisms only provide suboptimal performance within a network in connecting services to the network.

SUMMARY

Methods implemented in a software-defined networking (SDN) controller for placing services at network devices are disclosed. The SDN system contains a plurality of network devices managed by the SDN controller, and the SDN system offers a set of services to subscribers that consume bandwidths and utilize the set of services. A subset of the set of services is included in a chain of services for a subscriber, where an order of entries within the chain of services is defined. In one embodiment, the method starts with determining a list of bandwidth consumption entities of a service for each service within the set of services offered by the SDN system, where each bandwidth consumption entity is based on bandwidth consumed by one or more chains of services in which that service is included. Then a weight of each service is calculated based on the list of bandwidth consumption entities of the service and a service with the highest weight within a group of one or more services that have not been placed in the SDN system is selected. Then a network device is selected from the plurality of network devices managed by the SDN controller for the service is based at least partially on a calculation of bandwidth impacts to the SDN system by the service, wherein the calculation includes a calculation of a bandwidth utilization by the service at each available network device if the service is to be placed at the available network device.

Network device serving as a SDN controller managing a plurality of network device of a SDN system for placing services at the plurality of network devices are disclosed. The SDN system offers a set of services to subscribers that consume bandwidths and utilize the set of services. A subset of the set of services is included in a chain of services for a subscriber, where an order of entries within the chain of services is defined. In one embodiment, the network device contains a service allocation processor for allocating services to the plurality of network devices. The service allocation processor includes a weight calculator. The weight calculator is configured to determine a list of bandwidth consumption entities of a service for each service within the set of services offered by the SDN system, where each bandwidth consumption entity is based on bandwidth consumed by one or more chains of services in which that service is included, and calculate a weight of each service based on the list of bandwidth consumption entities of the service. The service allocation processor includes a service selector configured to select a service with the highest weight within the group of one or more services that have not been placed in the SDN system. The service allocation processor further includes a network bandwidth impact determinator configured to select a network device from the plurality of the network devices managed by the SDN controller for the service based at least partially on a calculation of bandwidth impacts to the SDN system by the service, wherein the calculation is to include calculation a bandwidth utilization by the service at each available network device if the service is to be placed at the available network device.

Non-transitory machine-readable storage media for memory allocation are disclosed. In one embodiment, a non-transitory machine-readable storage medium has instructions stored therein, which when executed by a processor, cause the processor to perform operations in a software-defined networking (SDN) controller managing a plurality of network device of a SDN system. The SDN system offers a set of services to subscribers that consume bandwidths and utilize the set of services, where a subset of the set of services is included in a chain of services for a subscriber, and where an order of the entries within the chain of services is defined. The operations include determining a list of bandwidth consumption entities of a service for each service within the set of services offered by the SDN system, where each bandwidth consumption entity is based on bandwidth consumed by one or more chains of services in which that service is included. Then a weight of each service is calculated based on the list of bandwidth consumption entities of the service and a service with the highest weight within a group of one or more services that have not been placed in the SDN system is selected. Then a network device is selected from the plurality of network devices managed by the SDN controller for the service is based at least partially on calculation of bandwidth impacts to the SDN system by the service, wherein the calculation includes a calculation of a bandwidth utilization by the service at each available network device if the service is to be placed at the available network device.

Embodiments of the disclosed techniques aim at placing services at a suitable network device in a SDN system to minimize bandwidth consumption of the SDN system.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIGS. 4A-D illustrates a method for placing a service to a network according to one embodiment of the invention.

FIG. 9 is a pseudo code illustrating bandwidth-aware service placement according to one embodiment of the invention.

DETAILED DESCRIPTION

Figure 1:
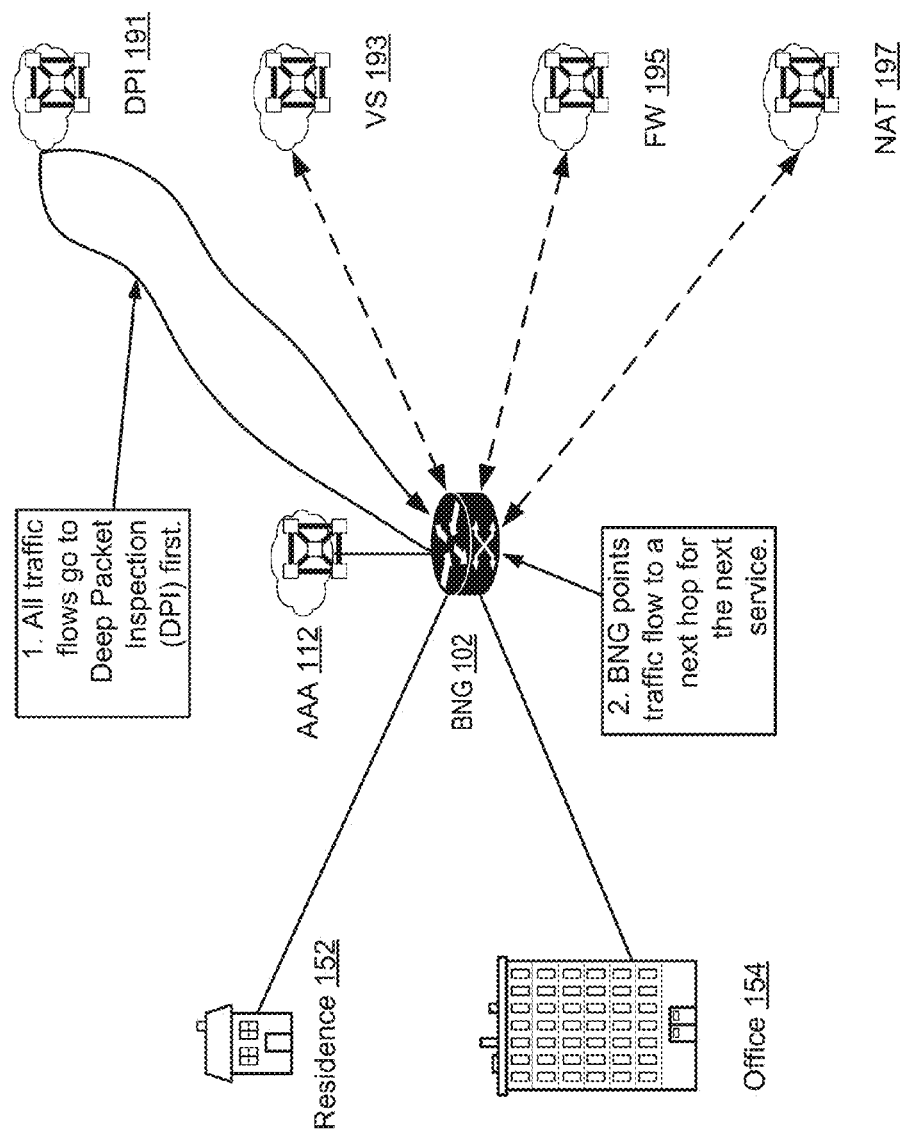
FIG. 1 illustrates an example of inline service chaining for broadband network customer traffic.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router or a switch) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics. In addition, the control plane also typically include ISO layer 2 control protocols such as Rapid Spanning Tree Protocol (RSTP), Multiple Spanning Tree Protocol (MSTP), and SPB (Shortest Path Bridging), which have been standardized by various standard bodies (e.g., SPB has been defined in IEEE Std 802.1aq-2012).

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Some network devices include service/functionality for AAA (authentication, authorization, and accounting) protocols (e.g., RADIUS (Remote Authentication Dial-In User Service), Diameter, and/or TACACS+ (Terminal Access Controller Access Control System Plus). AAA can be provided through a client/server model, where the AAA subscriber is implemented on a network device and the AAA server can be implemented either locally on the network device or on a remote end station (e.g., server end station) coupled with the network device. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network device (supporting AAA processing) coupled to core network devices coupled to server end stations of service/content providers. AAA processing is performed to identify the subscriber record for a subscriber. A subscriber record includes a set of attributes (e.g., subscriber name, password, authentication information, access control information, rate-limiting information, policing information) used during processing of that subscriber's traffic. Other services, such as deep packet inspection (DPI)

service, network address translation (NAT) service firewall (FW) service, and virtual scanning (VS) service may also be provided in a network for subscribers. As discussed herein below, these services may be performed in sequence thus offers service chain.

Objectives of Optimization in Service Chaining & Existing Solutions

In servicing chaining, the requirements for traffic steering solution are: efficiency, flexibility, scalability, and openness. With regard to the efficiency requirement, traffic should traverse middleboxes in the sequence specified by the network operators and should not unnecessarily traverse middleboxes. Great capital expenditure (CAPEX) savings could be achieved if traffic could be selectively steered through or steered away (bypassed) from specific services.

With regard to the flexibility requirement, a traffic steering solution should support subscriber, application, and operator specific policies simultaneously, all stemming from a single control point. Adding or removing new services should be easily done by the network operator.

With regard to the scalability requirement, a traffic steering solution should support a large number of rules and scale as the number of subscribers/applications grows. The ability to offer a per-subscriber selection of inline services could potentially lead to the creation of new offerings and hence new ways for operators to monetize their networks.

In addition, with regard to the openness, it should be possible to deploy any type of middlebox in the network. Deployment of the middlebox should be vendor independent in order to avoid vendor lock-in. Further, network operators should be able to leverage their current investment by reusing their existing middleboxes without modifications.

In general, network operators use policy-based routing (PBR) to forward the subscriber traffic towards the right services. They may also use access control lists (ACLs), virtual local area networks (VLANs), or other tunneling techniques to forward the packets to the right place. In some cases, service chaining can be partly performed by the services themselves, leaving less control to the operator over the remaining hops in a service path. In this case, the services must be configured to direct traffic to the next hop in the chain if the service box is not directly connected to the next hop.

FIG. 1 illustrates an example of inline service chaining for broadband network customer traffic. In network 100, it is assumed that regular residential traffic flows from resident 152 needs deep packet inspection (DPI) service, DPI 191, and network address translation (NAT) service, NAT 197. Premium residential traffic flows from resident 152 receives the same services in addition to firewall (FW) service, FW 195, and virtual scanning (VS) service, VS 193. Enterprise traffic flows from office 154 do not require service NAT 197, but they do need services DPI 191, FW 195 and VS 193. In this example, all traffic flows go through DPI 191 first at task box 1, and then the traffic flows go back to bounder network gateway (BNG) 102. At task box 2, BNG 102 directs the traffic flows to respective right next hop services such as VS 193, FW 195, and NAT 197 depending on the service sequences of the traffic flows.

The subscriber session authentication, authorization, and accounting (AAA) driven policy can define the first hop service at AAA 112 associated with BNG 102; however, this subscriber context information is no longer associated with the returned traffic from the DPI 191 after task box 1. Hence, determining the next service for a specific flow becomes non-trivial.

One approach to providing services to a network is to use a single box that runs multiple services. This approach consolidates all inline services into a single networking box (e.g., a router or a gateway) and hence avoids the need of dealing with inline service chaining configuration of the middleboxes. The operator adds new services by adding additional service cards to the single networking box.

The single box approach cannot satisfy the openness requirement as it is hard to integrate existing third party service appliances. This solution also suffers from scalability issues as the number of services and the aggregated bandwidth is limited by the capacity of the single box. Also, the number of slots in the chassis of the single box is limited.

A second approach to providing services to a network is to use statically configured service chains. One or more static service chains are configured, and each service is configured to send traffic to the next service in its chain. A networking box (e.g., a router or a gateway) classifies incoming traffic and forwards the traffic to services at the head of each chain based on the result of the classification.

The statically configured service chain approach does not support the definition of policies in a centralized manner and instead requires that each service be configured to classify and steer traffic to the appropriate next service. This approach requires a large amount of service specific configuration and is error prone. It lacks flexibility as it does not support the steering of traffic on a per subscriber basis and limits the different service chains that can be configured. Getting around these limitations would require additional configuration on each service to classify and steer traffic.

A third approach to providing services to a network is policy based routing (PBR). With the PBR approach, a networking box (e.g., a router or a gateway) using PBR is provided. Each service is configured to return traffic back to the networking box after processing the traffic. The networking box classifies traffic after each service hop and forwards it to the appropriate service based on the result of the classification. This approach suffers from scalability issues as traffic is forced through the networking box after every service. The network box must be able to handle N times the incoming traffic line rate to support a chain with N−1 services.

Additionally, a fourth approach providing services to a network is to use a policy-aware switching layer. A policy-aware switching layer for data centers explicitly forwards traffic through difference sequences of middleboxes. Using this approach satisfies the efficiency requirement but fails to meet the requirements of flexibility and scalability as each policy needs to be translated into a set of low level forwarding rules on all the relevant switches. Also, there is no explicit way to configure application related and subscribers related rules separately. They need to be manually consolidated into a set of low level rules. Moreover, it requires installing one rule for each new flow. Therefore, it is hard to scale with the number of subscriber/application combinations.

In summary, the known approaches above have drawbacks for optimizing service chaining. Since the existing solutions have not met the requirements for traffic steering, new solutions are needed.

Network Configurations and Operations

Figure 2:
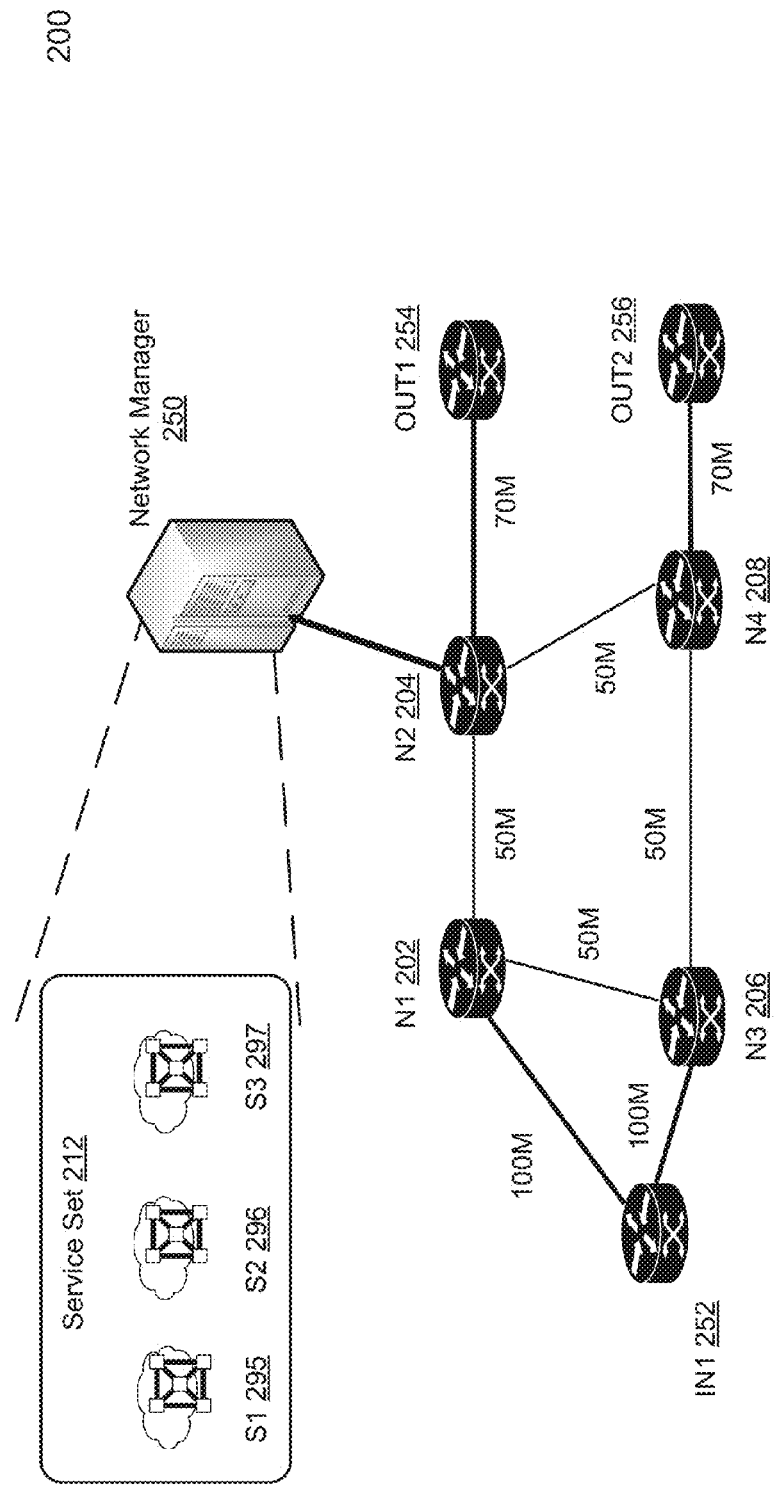
FIG. 2 is a block diagram illustrating a network can implement traffic steering according to one embodiment of the invention.

FIG. 2 is a block diagram illustrating a network can implement traffic steering according to one embodiment of the invention. Network 200 contains network manager 250. Network manager 250 can be a network management system (NMS), an element management system (EMS), or other centralized network manager of network 200. Network 200 also contains network devices, nodes N1-N4 for traffic forwarding/processing at references 202-208 respectively. N1-N4 can be a router, a switch, or other networking equipment as described herein above. In one embodiment, network manager 250 is integrated with one network device, such as network device N2 at reference 204. In other words, network manager 250 may not be a standalone entity in network 200, and some network device may perform functionalities of network manager 250.

Network 200 contains one ingress point IN1 at reference 252. An ingress point is where traffic flows into network 200 (for example, residence 152 or office 154 illustrated in FIG. 1). Network 200 also contains two egress points OUT1 and OUT2 at references 254 and 256 respectively. An egress point is where traffic flows out of network 200, for example, into internet cloud. IN1, OUT1, and OUT2 are network devices that reside at the border of network 200, and they may or may not be installed services. Note an egress point and ingress points are relative terms, and a network device may be an egress point for one subscriber and an ingress point for another subscriber at the same time, thus IN1 252 can be an egress point and OUT1 254 and 256 can be ingress points. The designation is for simplicity of illustration only.

The ingress point, egress points, and nodes are communicatively coupled through communication links between the entities. Each communication link, or link, is one of a power line, a radio frequency channel, an optical fiber, a copper line, and other suitable medium for communication (e.g., fluid, gas, or solid molecule vibration or motion), depending on implementation. The available bandwidth of each link is labeled next the link, for example, the link between IN1 252 and N1 202 has available 100 Mbps bandwidth in between for subscribers' traffic to transmit through.

Service set 212 represents services to be allocated to network 200. Services 295-297 may be services such as DPI 192, VS 193, FW 195, and NAT 197 as illustrated in FIG. 1. Services generally need to be performed in order. The ordering of services depends on a variety of factors such as subscriber requirement, application type, ordering policy of the network operators. A traffic flows within network 200 to be processed through a chain of services in a defined order.

Traffic steering in a network such as network 200 is a two-step process. The first step classifies incoming packets and assigns them a service chain based on the variety of factors such as subscriber requirement, application type, ordering policy of the network operators. The second step forwards packets to a next service based on its current position along its assigned service chain. This two-step traffic steering process only needs to be performed once between any two border networking boxes, regardless of the number of nodes that connects them. Thus, in order to optimizing network performance, a key decision is where to place the services that a network offers.

One solution in placing services in a network is disclosed in a U.S. patent application Ser. No. 13/751,826, entitled "Method and Apparatus for Placing Services in a Network," incorporated by reference herein. That solution aims at minimizing the average time it takes for subscribers' traffic to go through the required services. Yet, while the solution addresses concerns of subscribers of the network to obtain low latency, it does not address concerns of a network operator. A network operator has a set of criteria in determining desirability of a given solution and the set of criteria often does not align with the desirability of the given solution from a subscriber's point of view. For example, an internet service provider (ISP) may only have limited available bandwidth on each link and different placement strategies of services result in different consumption of bandwidth of the links. It can be advantageous to propose a solution to address both bandwidth consumption in the network and latency of services to subscribers.

The new solution to address both bandwidth consumption in the network and latency of services to subscribers may consider following aspects in placing services in a network:

First, different placement strategies can consume different amount of total available bandwidth in the network. This is because some placement solutions will result in traffic traversing extra links in the network. The latency may or may not be worse, but the total amount of bandwidth consumed in the network is larger.

Second, the link capacity and available bandwidth on different links of the network can be quite diverse. Thus, one placement strategy may consume almost all the available bandwidth on one link and make the link more likely to be congested, resulting in bad user experiences.

Third, a suboptimal placement solution can result in quite significant detour of the user traffic, resulting in large performance degradation measured by either the network operator or subscribers of the network.

Fourth, the sequence of middleboxes may not just be decided by the users, but also by the network operators. Certain set of middleboxes may have their own required sequences. For example, an intrusion detection system (IDS) may detect anomaly based on the traffic packet inter-arrival time. The traffic shaper, on the other hand, can significantly change the packet inter-arrival time characteristics. In this case, the operator may want to define a sequence that the traffic shaper should always be placed in front of the IDS. Another example is that, a firewall can filter out a large body of unwanted traffic, reducing the load for the subsequent middleboxes, so the operator can set a preference of placing firewall earlier in the chain.

Mathematical Formulation for Solutions of Bandwidth-Aware Services Placement

The problem of service placement can be formulated as a multi-objective optimization problem. The goal is to minimize the bandwidth consumption, while still satisfying the delay and available bandwidth constraints. More specifically, the problem is formulated as follows. Given a network G=(V, E), where V is the set of network devices and E is the set of links interconnecting the network devices, the solution needs to find locations for placing inline services.

The set of inline service can be denoted as $S=\{s_1, s_2, \ldots, s_h\}$, and each element is one type of services to be placed. Each subscriber has its own requirement on the sequence of inline services to traverse. For example, the requirement of subscriber i is:

$$r_i = Ing_1, S_1, S_3, S_5, S_2, Egr_1$$

where $Ing_1$ and $Egr_1$ are the ingress and egress locations of the subscriber's traffic. The set of requirements is $R=\{r_1, r_2, \ldots, r_k\}$, where there are k subscribers in total.

Each subscriber submit an estimated bandwidth of its traffic, for each flow f, the capacity it consumes is $C_f$. Each link in the network is associated with two variables: a delay value $d_{u,v}$ and an available-bandwidth value $B_{u,v}$. The delay variable can be simply $d_{u,v}=d_{v,u}=1$, meaning that the delay is approximated as the hop count. The available bandwidth can be a rough estimate of the unallocated bandwidth, or it can be profiled periodically using tools like bandwidth available in real-time (BART). A solution needs to find a subset of V' in V, and map the set S into V': $MAP=\{s_1:v_1, s_2:v_2, \ldots s_h:v_h\}$ The optimization problem may be formulated as follows:

$$\underset{map}{\text{minimize}} F(\text{map}) = \sum_{f}^{map} \sum_{(u,v) \in path_L^f} B_{u,v}$$

subject to $$\forall f, d(f)^{map} = \sum_{f} \sum_{(u,v) \in path_L^f} d_{u,v} < D$$

$$\forall e, \sum_{f}^{map} c_f \times \delta^{map}(f, e) < B_e$$

The goal is to minimize the total bandwidth consumption for all the flows f. It is computed as the summation over all flows, each of which is another summation of bandwidth consumption over all the links (u, v) traversed by path Lf traversed by flow f. This is computed under a specific service placement strategy map.

In one embodiment, the optimization problem is also subjected to two constraints:

(1). For each flow, the total latency traversed by this flow should be less than a pre-specified threshold D. This threshold can be determined as the service level agreement (SLA) in the contract between the network provider and the customers;

(2). For each link e in the network, the total capacity consumed by all the flows f traversing it should be smaller than its available capacity. Here the function $\delta^{map}(f,e)$ is a function to denote if the path of f is traversing link e under the placement map:

$$\delta^{map}(f, e) = \begin{cases} 1 & \text{if } f \text{ traverses } e \\ 0 & \text{otherwise} \end{cases}$$

To solve the optimization problem, we first build a graph $G_1=(V_1,E_1)$, where $V_1$ are the h services and all the edge switches (including the ingress and egress points), and the edge in $E_1$ means that there is flow traversing between the two nodes, and the weight of the edge means the total bandwidth between two nodes. This graph can be created using the network topology, and the customers' inputs. It is essentially a dependency graph, modeling the dependencies between each individual service and other services plus all the ingress and egress network devices.

Next, we iteratively place the services. Each time, we first select a target service to be placed, and then among all the possible locations, we select the most appropriate one. Thus, the keys of the solution are the selection of the target service and definition of the most appropriate location.

For the placement of the target service, the concept of bandwidth dependency of a service is defined. The bandwidth dependency of a service qualifies how severe a location of a service should depend on locations of other entities. The entities considered include other services in S as well as all the ingress and egress nodes in G. The bandwidth dependency of a service between any pair of nodes, no matter if there is a direct link in $E_1$ between them or not, and the relative bandwidth between them, i.e. the total amount of traffic between these two nodes over all the traffic.

For each node in $V_1$, we assign a weight of this node, which is computed as the sum of the bandwidth dependency over all nodes, consisting of both from the ingress point, as well as from all other services.

We use an intra-bandwidth (referred to as INTERBW) matrix to compute the subscribers' traffic between services as well as between services and edge nodes.

Then the problem is transferred to a graph mapping problem: mapping $G_1$ into G, so that the objective and the constraints are satisfied. However, it is still different from the standard mapping problem, because the edge nodes (ingress and egress points) are fixed. Thus, we first consider the edge nodes of $G_1$ are already mapped to G. Then we focus on mapping the remaining service nodes in $G_1$.

This process may be performed iteratively. The process picks one unplaced service that has the largest weight in each iteration. Then the process searches for all locations in G, regardless whether a service has been placed in some of the nodes or not as multiple services may be installed at the same location, as long as the total amount of bandwidth consumed is below its capacity. In one embodiment, the all location excludes bounder nodes.

For each node, the process determines bandwidth dependency. It first computes the available bandwidth of all its paths to all other nodes in G. The available bandwidth is referred to as AVAILABLE_BW. If the AVAILABLE_BW of a node is lower than the bandwidth dependency count of the selected service, it means that the available bandwidth at the node is not enough for the service, and the node is then removed from consideration. If the AVAILABLE_BW of the node is higher than the bandwidth dependency count, the node is a candidate to place the selected service, and the node is referred to as an available node.

For an available node, the process computes the bandwidth consumption between the location and any nodes that already allocated services. The sum of all bandwidth consumption between the location and all nodes that already having services allocated is the total bandwidth impact of the service placing at the node. With computation done with all available nodes, the process selects the node with the lowest bandwidth impact. When two or more nodes having the same lowest bandwidth impact, the process selects one node with lowest available bandwidth after placing the service in one embodiment. The advantage of this embodiment is to reduce bandwidth fragmentation—less leftover bandwidth on a given node, so that a future large bandwidth request may be accommodated.

Embodiments of Bandwidth-Aware Service Placement

Figure 3:
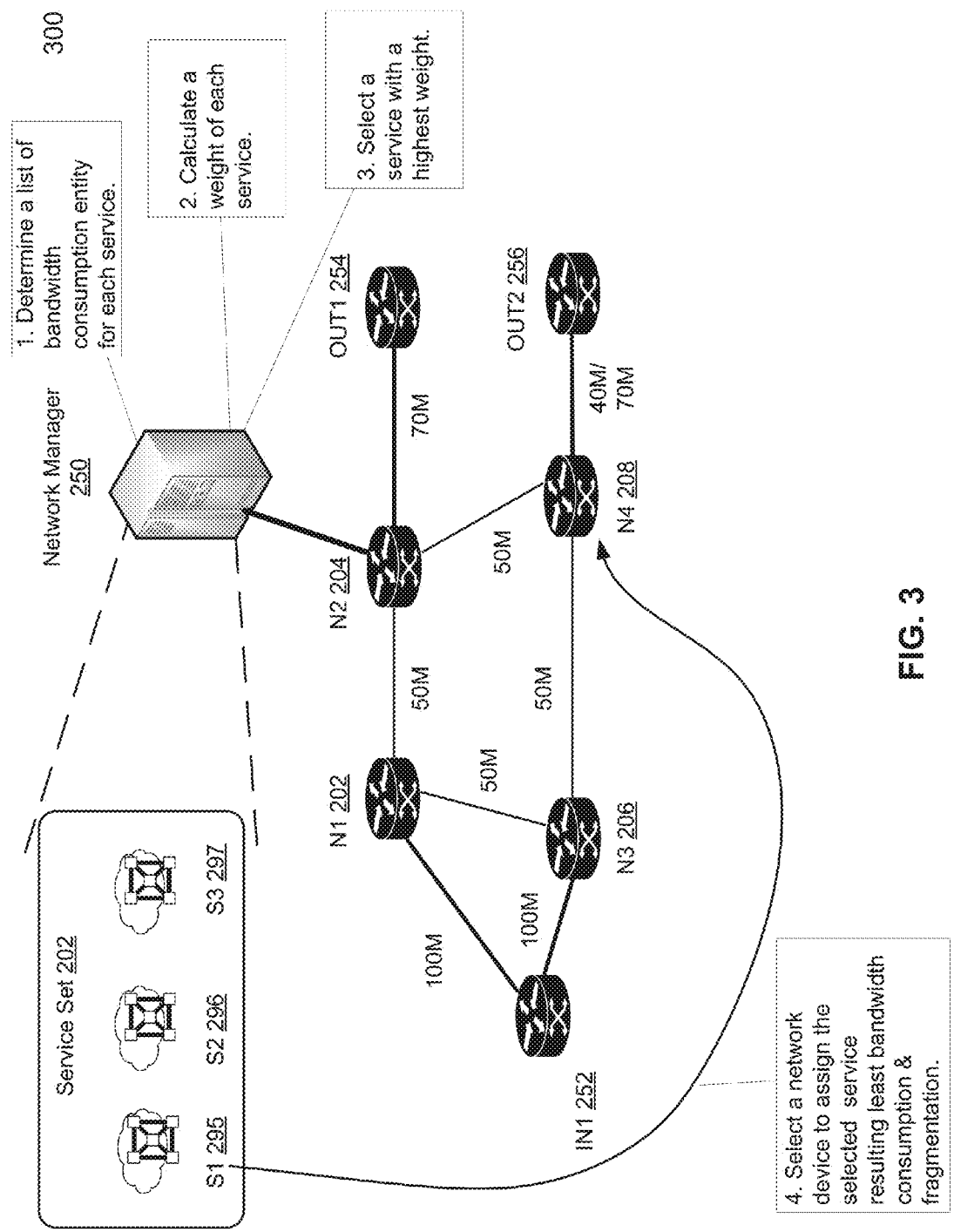
FIG. 3 is a block diagram illustrating bandwidth-aware service placement according to one embodiment of the invention.

FIG. 3 is a block diagram illustrating bandwidth-aware service placement according to one embodiment of the invention. FIG. 3 is similar to FIG. 2, and the same or similar references indicate elements or components having the same or similar functionalities. An embodiment of bandwidth-aware service placement places a service to a network device in four steps.

At task box 1, network manager 250 determines a list of bandwidth consumption entities for each service. The services may include services that have already been placed in the network as well services that have not been placed. Each bandwidth consumption entity of a service is a value of bandwidth consumption to or from an entry of the one or more chains of services that the service is included.

Then at task box 2, network manager 250 calculates weight of each service. The weight is a sum of values of bandwidth consumptions of all bandwidth consumption entities of the service in one embodiment. The weight is an absolute bit rate value in one embodiment. In another embodiment, the bandwidth dependency can be a ratio, for example, in comparison to some other bandwidth values in gauging the bandwidth dependency of a service.

At task box 3, network manager 250 selects a service with the highest weight from unplaced service set 212. The unplaced service with the highest weight is selected because it represents the most impactful unplaced services, meaning that many flows come out from this service and enters other services. When multiple services with the same highest weight, network manager 250 may utilize a number of known tie-breaking mechanisms. For example, network manager 250 may select the service with lowest service index. Another tie-breaking mechanism can be the estimated processing complexity of this service.

The selected service then is attached to a network device resulting in the least bandwidth consumption and fragmentation at task box 4. To find the network device resulting in the least bandwidth consumption and fragmentation, network manager 250 puts one network device in consideration at one time. In one embodiment, network manager 250 first determines if by placing the service on a network device, the total path (1) can meet delay requirements of traffic flows using the selected service, and (2) has enough available bandwidth to install the selected service. If either condition is not satisfied, the network device is removed from consideration (as it is an unavailable network device). For each available network device, network manager 250 calculates a bandwidth utilization value by the selected service, in consideration of bandwidth consumption of traffic flow using the service and also services have already placed in network 300 if there is any.

Network manager 250 then compares the bandwidth utilization values of the available network devices, and selects the one with the lowest bandwidth utilization to install the service. When more than one available network device has the same lowest bandwidth utilization, network manager 250 select the network device resulting in the least available bandwidth after the installation to achieve lower network bandwidth fragmentation.

After the selected service is placed in network 300, network manager 250 removes the service from service set 212. It then computes/selects a service with the highest weight of the remaining unplaced services and places the service to network 300. The process continues until all the services are attached to network devices within network 300. Note that the traffic bandwidth consumption information may be from several sources. One real-time measurement of traffic flows. Another is derived from bandwidth consumption information provided by subscribers. The other is an estimate, which may be based on a historical data regarding factors such as characteristics of traffic flows and subscriber service selection during a defined time period.

Also note that the process can be performed in a fixed time interval (e.g., every day, week, month, or any other suitable interval determined by an operator of network 300) or at the request of operator/subscribers. For virtual appliances, where services are implemented in virtual machines, we can move the services more dynamically. In other words, service placement for service chaining is not permanent, and the placement may be updated due to changing characteristics of the network, subscriber requests, and subscriber behaviors.

FIGS. 4A-D illustrates a method for placing a service to a network according to one embodiment of the invention. FIGS. 4A-D describes placing a service to network 300 as illustrated in FIG. 3. FIG. 4A illustrates a list of subscriber bandwidth requests. Each subscriber has her own requirement on the sequence of services to traverse, and each subscriber has a bandwidth request associated with the sequence of services to traverse.

As illustrated, there are four service chains from subscribers, R1-R4. There are four services, S1-S4, need to be allocated in the network. Each service chain starts with an ingress point (all IN1 in this example) and ends with an egress point (OUT1 or OUT2). Each service chain contains its bandwidth request (denoted as CF), 10 or 20 Mbps. The service chain and/or bandwidth request may be derived from a service level agreement between a subscriber and the operator of the network in one embodiment. In another embodiment, the bandwidth request may be an estimate based on the subscriber's past traffic flow (e.g., from historical data collection).

FIG. 4B illustrates determining of inter-service bandwidth requests of a service according to one embodiment of the invention. From the service chains in FIG. 4A, network manager 250 determines a list of bandwidth consumption entities for each service. For S1, it involves in all four service chains, so we need to collect all inter-service bandwidth (INTERBW) requests of R1-R4. The list of bandwidth consumption entities are illustrated in FIG. 4B and each entity is a unidirectional entity as in service chains, order of the services need to be followed. The INTERBW requests for each entity of the service services are determined similarly to the determination of S1. In this example, there are eight bandwidth consumption entities in the list.

FIG. 4C illustrates determination of weights for all services according to one embodiment of the invention. The weight for all services is the sum of the list of INTERBW, including both directions, i.e., to or from a service. For example, for S1, the bandwidth requests from S1 to other services and the egress point in service chains is the first four items of FIG. 4B, and the sum of bandwidth is 60 M bps. The last four items of FIG. 4B are bandwidth requests to S1 and the sum of bandwidth is 60 Mbps too. Thus, the weight for S1 is 60+60=120 Mbps. Similarly, the weights for S2 and S3 are calculated to be 60 Mbps and 80 Mbps respectively. Since S1 has the highest weight, it is selected for placement in network 300.

FIG. 4D illustrates determination of bandwidth impacts of a service according to one embodiment of the invention. S1 has been selected due to its high weight. Network manager 250 determines the bandwidth impact of S1 in place of various locations within the network. Assuming S1 is placed at N1 202 in FIG. 3, the bandwidth impact of placing S1 at various nodes can be calculated as follow.

At N1 (120 M):

IN1→S1: 30 M (10 M of R1 and 20 M of R2);

S1→OUT2: 90 M (20×3=60 M of R3 as traffic needs to traverse three links of N1-N2-N4-OUT2 to reach OUT2 and similarly 10×3=30 M of R4).

At N2 (120 M):

IN1→S1: 60 M (10×2=20 M of R1 as traffic needs to traverse two links of IN1-N1-N2 and similarly 20×2=40 M of R2);

S1→OUT2: 60 M (20×2=40 M of R3 as traffic needs to traverse two links of N2-N4-OUT2 to reach OUT2, and similarly 10×2=20 M of R4).

At N3 (90 M):

IN1→S1: 30 M (10 M of R1 and 20 M of R2);

S1 OUT2: 60 M (20×2=40 M of R3 as traffic needs to traverse two links of N3-N4-OUT2 to reach OUT2, and similarly 10×2=20 M of R4).

At N4 (90 M):

IN1→S1: 60 M (10×2=20 M of R1 as traffic needs to traverse two links of N1-N2-N4 and similarly 20×2=40 M of R2);

S1→OUT2: 30 M (20 M of R3 and 10 M of R4).

Note both placements at N3 and N4 results in the same amount of bandwidth impact. In one embodiment, the post-placement available bandwidth breaks the tie. For example, the placement with the lower available bandwidth after the placement is deemed to be the better network device for the placement as it will results in lower bandwidth fragmentation so that future request can be accommodated easier. In this example, the post-placement bandwidth at N3 would be 110 M while the post-placement bandwidth at N4 would be 80 M, thus N4 is selected to place S1.

After S1 is placed, the process removes S1 from the unplaced service set and it goes back to FIG. 4C and select the service with the then highest weight to place. It then goes through calculation of the bandwidth impact of placing S2 at various nodes. The difference is that now in calculation for S2, the bandwidth between the existing S1 and unplaced S2 needs to be included in impact calculation. Note even though N4 has S1 placed already, it is still included in the bandwidth impact calculation as a node may have several services installed. The node with lowest bandwidth impact is then selected. The process continues until all unplaced services are placed.

Note in one embodiment, ingress and egress points are also considered to place a selected service. In that case, the bandwidth impact of the selected service needs to be calculated and compared.

The methods illustrated in FIGS. 3-4 are performed in a traditional network, where a single node performs both control plane and data plane functionality. The methods can also be utilized in a network with different architecture.

Software Defined Networking (SDN)

Figure 5:
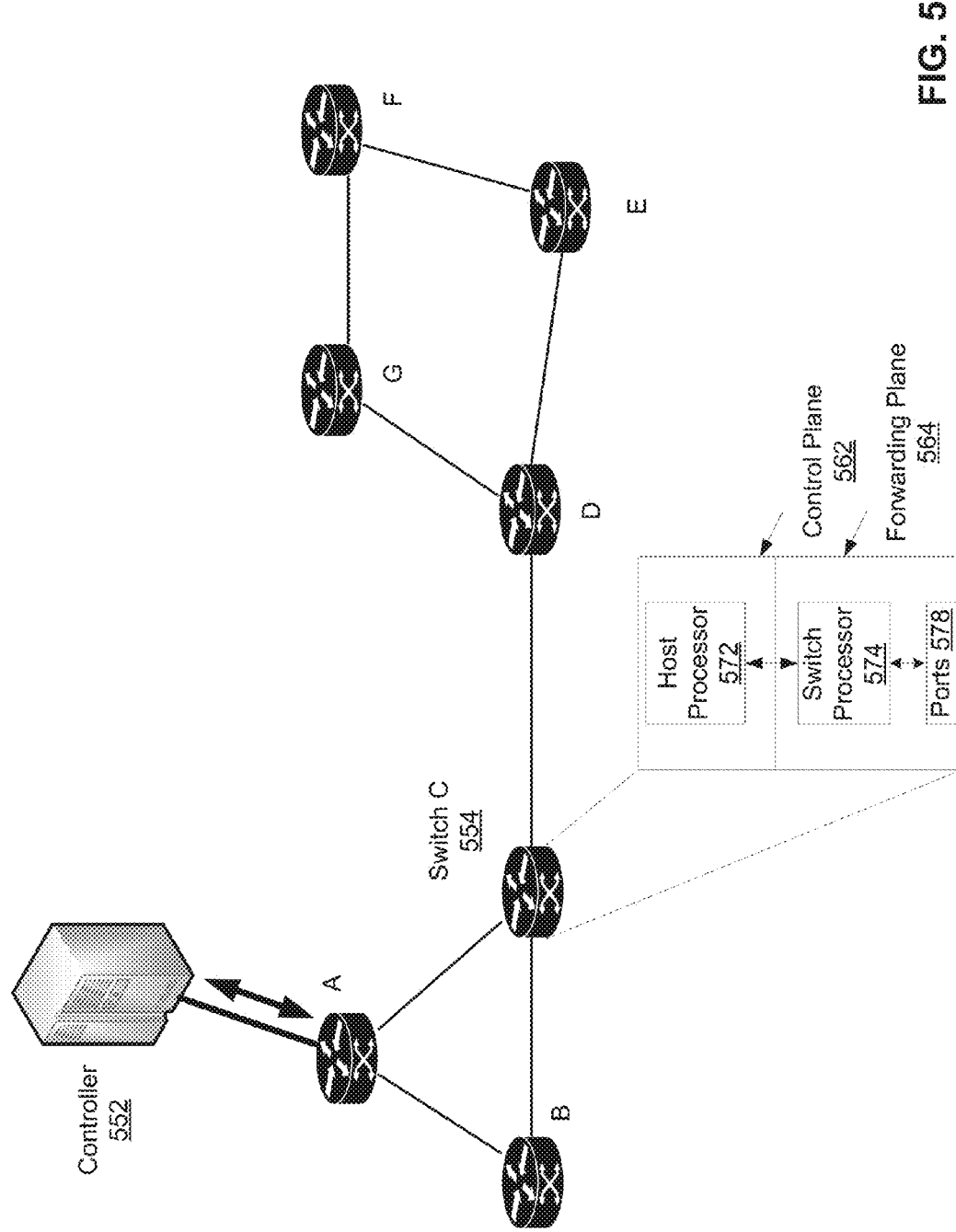
FIG. 5 is a block diagram illustrating a SDN network.

FIG. 5 is a block diagram illustrating a SDN network. SDN network 500 comprises a number of forwarding elements and a number of controllers that instruct the forwarding elements' forwarding behavior. Note a SDN network may contain a much larger number of network devices and existing network devices may be implemented with SDN compatible protocols thus become a part of a SDN network (e.g., an existing IP router may support OpenFlow protocol and thus become a SDN forwarding element or a SDN controller). Thus SDN network 600 is for illustrating logical SDN network configuration only.

Forwarding Elements

The main task of a SDN forwarding element (referred to as an OpenFlow switch or simply switch in OpenFlow parlance when the SDN complies with OpenFlow standards), is to forward packets within the SDN forwarding element from an ingress port to an egress port, according to the rules in flow tables programmed by one or more SDN controllers. Each flow entry contains a set of actions such as forwarding packets to a given port, modifying certain bits in a packet header, encapsulating packets to the SDN controller, or dropping the packets. For the first packet in a new flow, the forwarding element often forwards the packet to the SDN controller to trigger the new flow being programmed. It can also be used to forward slow-path packets such as Internet Control Message Protocol (ICMP) packets to the SDN controller for processing. Note that the concept of a flow can be defined broadly, e.g., a TCP connection, or all traffic from a particular MAC address or IP address. Also note that a packet within a SDN network is defined broadly and it may be an Ethernet frame, an IP network packet, or a message in a proprietary format.

SDN Controllers

A SDN controller (often referred to as a remote controller or controller) adds and removes flow-entries from a flow table. It defines the interconnection and routing among a set of SDN forward elements and other network devices. It also handles network state distribution, such as collecting information from the set of SDN forward elements and distributing forwarding/routing instructions to them. The SDN controller can also be programmed to support new addressing, routing, and complex packet processing applications. The SDN controllers are the "brains" of a SDN network. A forwarding element needs to connect to at least one SDN controller to function correctly.

Referring to FIG. 5, SDN network 500 contains SDN controller 552 and a set of forwarding elements (or SDN switches, the terms "forwarding element" and "SDN switch" are used interchangeably herein below) A-G. Controller 552 (the terms "controller" and "SDN controller" are used interchangeably herein below) manages SDN switches A-G, and an SDN switch connects to its managing controller through a communication channel and the SDN switch not necessarily has a direct connectivity to a controller (thus the term "remote" controller).

An SDN switch can be viewed logically as containing two main components. One is a control plane and the other is a forwarding plane. A zoom-in view of SDN switch C at reference 554 illustrates the two planes. SDN switch C contains control plane 562 and forwarding plane 564. Control plane 562 coordinates management and configuration of SDN switch C. Configuration of forwarding plane 564 is achieved by running applications on host processor 572. Host processor 572 usually runs an operating system in order to provide a well-known development environment. Commands from host processor 572 are sent to the switch processor 574 using an interconnect (e.g., a peripheral component interconnect (PCI) bus). Exception packets (e.g., packet for routing and management) are often processed on host processor 572. Switch processor 574 interacts with various forwarding ports 578 of SDN switch C to forward and otherwise process incoming and outgoing packets.

Forwarding plane 564 is responsible for forwarding traffic (forwarding operations includes switching, routing, learning, etc.). It contains switch processor 574 that is designed to provide high throughput at the detriment of a more complex and flexible development environment. Different types high performance memory and hardware accelerator are often found on board of switch processor 574 for achieving the high throughput. In contrast, host processor 572 can be more complex and flexible at the detriment of providing high throughput as it processes more control packets (often referred to as slow path packets) than data packet thus throughput is less mission critical. When a SDN switch (e.g., SDN switch C) receives a packet associated with a new flow, it does not know where to forward the packet. Thus it sends the packet to its managing SDN controller, controller 552 in this example. Controller 552 receives the packet, and it programs a new flow entry and sends to SDN switch C. SDN switch C then forwards the packet according to the new flow entry.

An SDN network provides an opportunity to design dynamic anomaly detection methods in a network that makes use of the centralized control plan and the network-wide knowledge. More specifically, dynamic anomaly detection methods can be implemented as an application running on the SDN controller. The application can interact with the routing application in the same controller to perform mitigation actions after a traffic anomaly is detected. Thus, the traffic anomaly and migration can be integrated without manual intervention. The SDN controller already has commands to collect flow statistics from the SDN switches, and dynamic anomaly detection methods can utilize these existing interfaces.

On the other hand, the decoupling of control/forwarding plane in an SDN network presents a challenge in achieving efficiency and scalability with dynamic anomaly detection methods. The following discussion explores deploying dynamic anomaly detection methods in an SDN network in more details.

Figure 6:
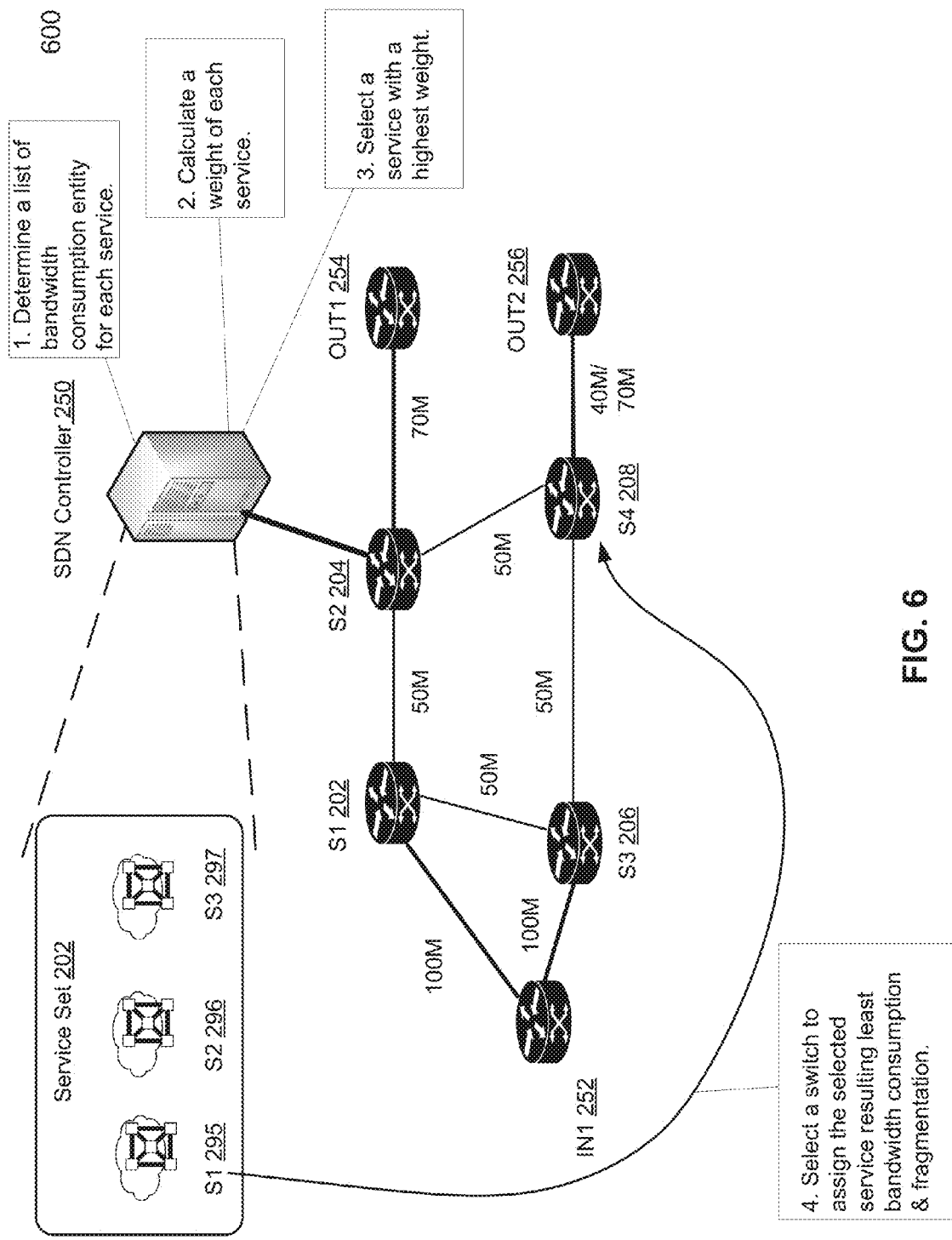
FIG. 6 is a block diagram illustrating bandwidth-aware service placement in a SDN system according to one embodiment of the invention.

FIG. 6 is a block diagram illustrating bandwidth-aware service placement in a SDN system according to one embodiment of the invention. FIG. 6 is similar to FIG. 3, and the same or similar references indicate elements, components having the same or similar functionalities. The four-step process for placing services is also the same. Thus, only the difference to FIG. 3 is highlighted. The network manager is now a SDN controller that controls the placement of the services. The network devices are now switches, denoted with "S" followed by a serial number instead of "N." Otherwise, the embodiments of the invention disclosed herein above apply similarly to a traditional network.

Processes of Bandwidth-Aware Service Placement

Figure 7:
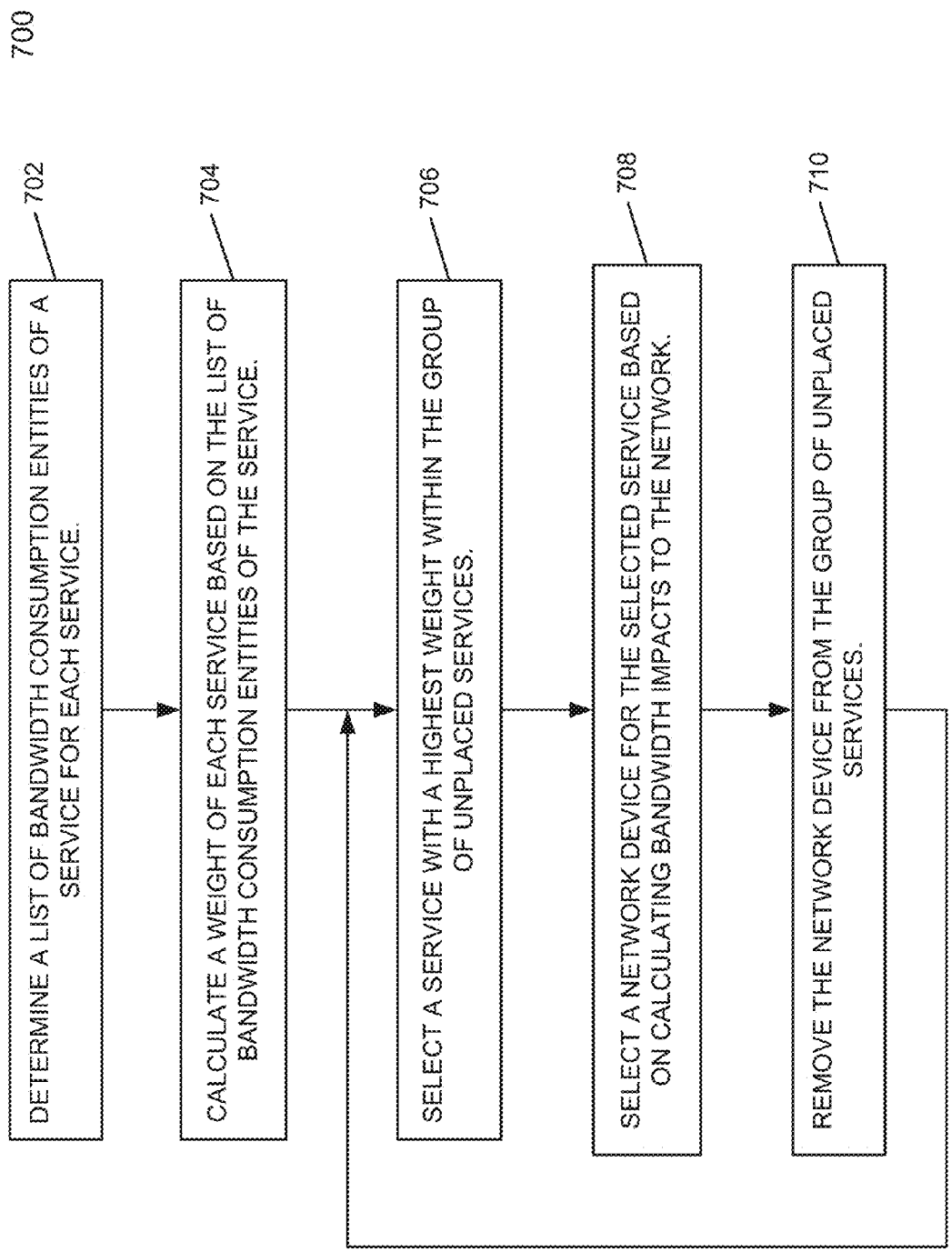
FIG. 7 is a flow diagram illustrating bandwidth-aware service placement according to one embodiment of the invention.

FIG. 7 is a flow diagram illustrating bandwidth-aware service placement according to one embodiment of the invention. Method 700 may be implemented in a network manager of a traditional network or a SDN controller of a SDN network. The network manager or SDN controller is aware of service chains of the network and it performs the task of placing services offered to subscribers to various network elements (e.g., routers, bridges, and SDN switches). The network manager or SDN controller is further aware of subscriber's bandwidth consumption using various service chains and use the knowledge for service placement.

The knowledge of subscribers' bandwidth consumption using various service chains may be based on historical data of subscribers' bandwidth consumption over a period of time. It may also be based on service level agreement between subscribers and the operator of the network. The operations of method 700 are described below using a network manager as an example and a SDN controller follows the same process.

At operation 702, the network manager determines a list of bandwidth consumption entities for each service of the network. Each bandwidth consumption entity is based on a bandwidth consumption of a service chain that a service is included. Bandwidth consumption of both directions of service chains including the service is included in forming the list.

At operation 704, a weight is calculated for each service based on the list of bandwidth consumption entities of the service. In one embodiment, the weight of a service is a sum of bandwidth consumption values of the service. In another embodiment, the weight is a ratio in comparison to a known bandwidth.

Then at operation 706, the service with the highest weight is selected from all services that have not been placed. The selected service is then placed in the network, and the placement is based at least partially on calculating bandwidth impacts to the network by the service at operation 708. Once the selected service is placed in the network, it is removed from the group of unplaced services at operation 710. As long as the group of unplaced services is not empty, method 700 goes back to operation 706 and selects a service with the highest weight within the updated group of unplaced services to place in the network. The process reiterates until all services are placed.

Figure 8:
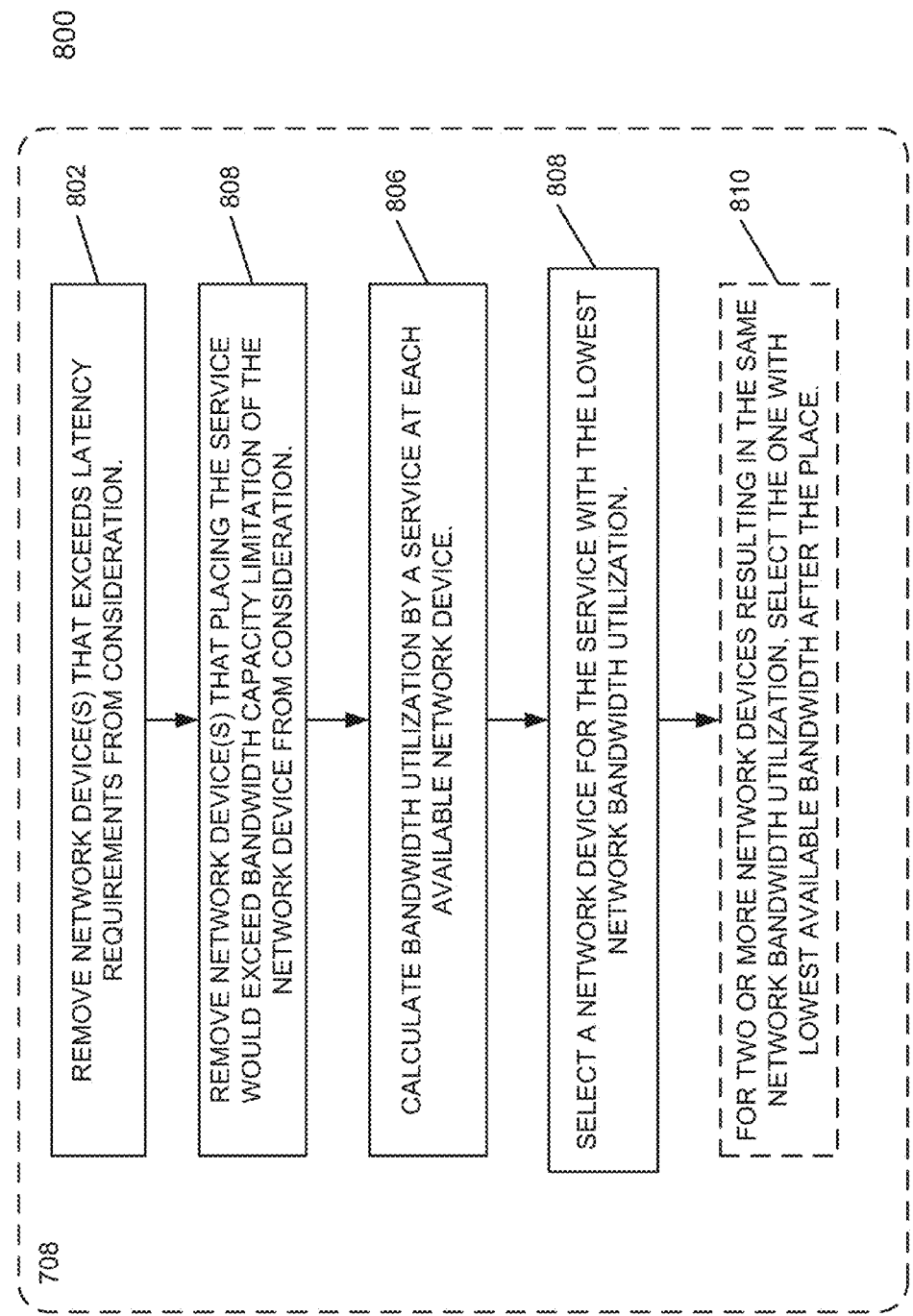
FIG. 8 is a flow diagram illustrating selection of network device in placing services according to one embodiment of the invention.

FIG. 8 is a flow diagram illustrating selection of network device in placing services according to one embodiment of the invention. The operations in FIG. 8 are a zoom-in of operation 708 of FIG. 7. Thus at method 800, a service has already been selected to be placed in a network. Method 800 is performed to select a network device from a network to place the selected service.

At operation 802, a network manager removes network device(s) where a placement would cause latency requirement of subscriber or service chains to be exceeded. That is, if placing the selected to a network device would make the latency intolerable, the network device is removed from consideration. Similarly at operation 804, the network manager removes network device(s) where a placement would cause the network device exceeds its bandwidth capacity. That is, no placement shall exceed a network device's bandwidth capacity. With operations 802 and 804, a number of network devices are removed from consideration, and these network devices are referred to as "unavailable" network devices. After the removal, the remaining "available" network devices are then considered for placement.

At operation 806, a bandwidth utilization by the selected service at each available network device is calculated. The calculation determines the bandwidth impact of the service at an available network device with consideration all the services that already placed in the network and ingress/egress points. The set of bandwidth utilization at each available network device is then compared and the network device with the lowest network bandwidth utilization is selected at operation 808. In the case where more than one network device has the same lowest network bandwidth utilization, select the network device resulting in the lowest available bandwidth after placing the service to place the service at operation 810.

FIG. 9 is a pseudo code illustrating bandwidth-aware service placement according to one embodiment of the invention. The pseudo code takes G, S, and R as input at reference 902. As discussed herein above, G=(V, E), where V is the set of network devices and E is the set of links interconnecting the network devices. S is the set of inline services of the network. R is the bandwidth request of subscribers, and R is in the form of a list of service chains, including ingress and egress points. R also includes latency requirement D and bandwidth capacity of network devices, $B_e$.

When the process starts, all services are unplaced, thus Unplaced=S. Then through operations at reference 904, a list of bandwidth consumption entities of a service is determined for each service, where INTERBW denotes the calculation result. Through operations at reference 906, as long as the unplaced service is not empty, the weight is calculated for each service. Note the weight calculation includes both placed (RATIO_P) and unplaced services (RATIO_U). The total weight (RATIO) is the combination of both.

Then through operations at reference 908, the process goes through all network devices to calculate bandwidth utilization. For each network device, if the latency requirement can't be met, the network device is removed from consideration. Similarly, if the available bandwidth is less than the weight of service, the network device is removed from consideration. Then the network device with the lowest bandwidth utilization is selected, and the service is removed from the unplaced service set UnPlaced. The process continues until all the services are placed.

Network Devices Implementing Bandwidth-Aware Service Placement

Figure 10:
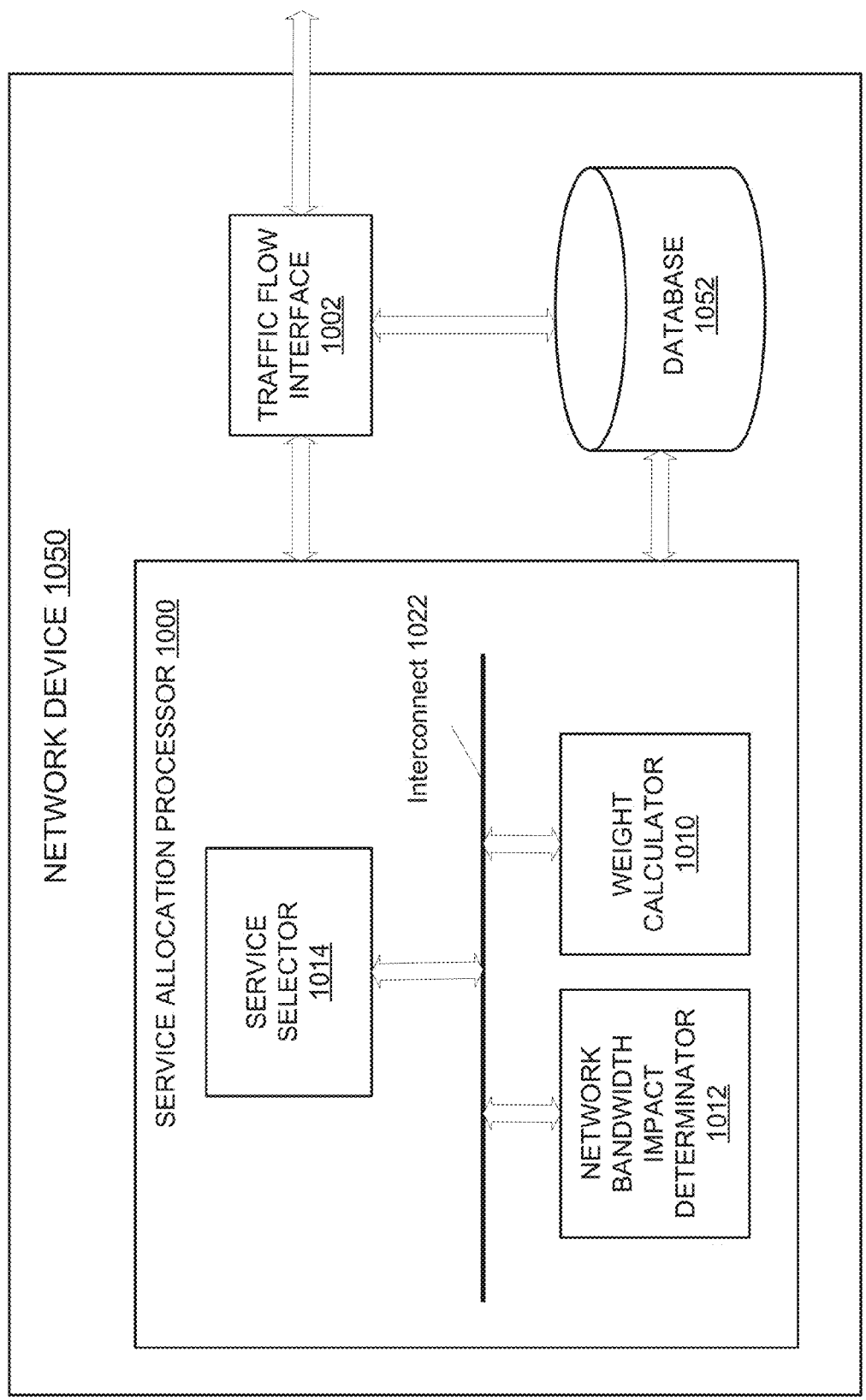
FIG. 10 is a block diagram illustrating a network device containing a processor implementing a method of allocating services according to one embodiment of the invention.

FIG. 10 is a block diagram illustrating a network device containing a processor implementing a method of allocating services according to one embodiment of the invention. Subscribers of the services utilize the services following service chains, and the services are utilized following the order of services within the service chains. In one embodiment, each service chain includes an ingress and egress points at the beginning and end of the service chain respectively. Service allocation processor 1000 may be a standalone processor or a part of a processor within a SDN controller of a SDN network or a network device of a traditional network. That is, network device 1050 may be a SDN controller or a network device of a network. When service allocation processor 1000 is a part of a larger processor, it may have dedicated network processing unit (NPU) or share processing unit with other application.

Network device 1050 contains a traffic flow interface 1002 configured to collect information about the bandwidth consumed by the subscribers of the network and the services utilizing the services and service chains. The information may be collected over a period of time and it may also be collected based on service level agreements between the subscribers and operators of the network. The bandwidth consumption information is the basis of the service placement. Network device 1050 also contain database 1052. Database 1052 may be configured to store one or more latency requirements associated with chains of services of the network. Database 1052 may be configured to store one or more bandwidth capacity limitations associated with network devices of the network. The latency requirements and bandwidth capacity limitations are utilized to remove network devices from placement consideration when a placement would exceed one of the latency requirements and bandwidth capacity limitations.

Service allocation processor 1000 may contain weight calculator 1010, service selector 1014, and network bandwidth impact determinator 1012. These various modules are interconnected through interconnect 1022. Note that various modules can be implemented as a single unit or multiple units, the unit or units integrate various modules and perform similar function as the modules of service allocation processor 1000, and these modules can be implemented in software, hardware or a combination thereof. Some modules illustrated in FIG. 10 may be implemented outside of service allocation processor 1000 but communicatively coupled with service allocation processor 1000. In addition, some modules outside of service allocation processor 1000 may be implemented within service allocation processor 1000.

In one embodiment, service allocation processor 1000 is configured to allocate services to network devices of the network. Weight calculator 1010 is configured to determine a list of bandwidth consumption entities of a service for each service within the set of services of the network. Each bandwidth consumption entity is based on one or more chains of services. Weight calculator 1010 is then configured to calculate a weight of each service based on the list of bandwidth consumption entities of the service. In one embodiment, the calculation is to sum up of all the bandwidth consumption of the list of bandwidth consumption entities of the service.

Service selector 1014 then selects a service with the highest weight to be placed in the network. The selected service is then considered for placement in network bandwidth impact determinator 1012. Network bandwidth impact determinator 1012 is configured to select a particular network device of the network for the service based at least partially on calculating bandwidth impacts to the network by the service. In one embodiment, the selection also excludes any network device that would result in exceeding latency requirements of service chains or bandwidth capacity limitations. The selection is performed by calculating a bandwidth utilization by the service at each available network device of the network if the service is place at the available network device and selecting a particular network device to place the service, where the selection results in the lowest bandwidth utilization at the network by the service. When more than one network device have the same lowest bandwidth utilization, service selector 1014 selects the network device resulting in a minimum remaining available bandwidth at the network device after placing the service.

The operations of the flow diagrams in FIGS. 7 and 8 are described with reference to the exemplary embodiment of FIG. 10. However, it should be understood that the operations of flow diagrams can be performed by embodiments of the invention other than those discussed with reference to FIGS. 7 and 8, and the embodiments discussed with reference to FIG. 10 can perform operations different than those discussed with reference to the flow diagrams of FIGS. 7 and 8.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a software-defined networking (SDN) controller of a SDN system, wherein the SDN system contains a plurality of network devices managed by the SDN controller, wherein the SDN system offers a set of services, wherein a subset of the set of services is included in a chain of services for a subscriber, wherein an order of entries within the chain of services is defined, the method comprising:

determining a list of bandwidth consumption entities of a service for each service within the set of services offered by the SDN system, wherein each bandwidth consumption entity is based on bandwidth consumed by one or more chains of services in which that service is included;

calculating a weight of each service based on the list of bandwidth consumption entities of the service;

selecting a service with the highest weight within a group of one or more services; and selecting a network device from the plurality of network devices managed by the SDN controller for the service based at least partially on a calculation of bandwidth impacts to the SDN system by the service and resulting in a minimum remaining available bandwidth at the network device after attaching the service when more than one network device is selected to achieve the lowest bandwidth utilization at the SDN system by the service, wherein the calculation includes calculation of a bandwidth utilization by the service at each available network device if the service is to be placed at the available network device.

2. The method of claim 1, further comprising: removing the service from the group of one or more services after selecting the network device for the service;
selecting another service with the highest weight within the group for network device selection.

3. The method of claim 1, wherein at least one chain of services contains a latency requirement, and wherein selecting the network device for the service is further based on satisfying the latency requirement.

4. The method of claim 1, wherein selecting the network device for the service is further based on not exceeding a bandwidth capacity limitation of the network device.

5. The method of claim 1, wherein the bandwidth consumed by the one or more chains of service in which the service is included is based on at least one of a historical data of the subscribers of the one or more chains of services during a time period.

6. The method of claim 1, wherein each chain of services includes an ingress at the beginning of the chain and an egress at the end of the chain, and wherein each of the ingress and egress is a network device of the SDN system.

7. The method of claim 1, wherein each bandwidth consumption entity of one service is a value of bandwidth consumption to or from an entry of the one or more chains of services in which the service is included.

8. The method of claim 1, wherein the weight of a service is a sum of values of bandwidth consumptions of all bandwidth consumption entities of the service.

9. A network device serving as a software-defined networking (SDN) controller managing a plurality of network devices of a SDN system, wherein the SDN system offers a set of services, wherein a subset of the set of services is included in a chain of services for a subscriber, wherein an order of entries within the chain of services is defined, the network device comprising:
a service allocation processor for allocating services to the plurality of network devices, the service allocation processor including: a weight calculator configured to determine a list of bandwidth consumption entities of a service for each service within the set of services offered by the SDN system, wherein each bandwidth consumption entity is based on bandwidth consumed by one or more chains of services in which that service is included, and
the weight calculator further configured to calculate a weight of each service based on the list of bandwidth consumption entities of the service;
a service selector configured to select a service with the highest weight within a group of one or more services; and
a network bandwidth impact determinator configured to select a network device from the plurality of network devices managed by the SDN controller for the service based at least partially on calculation of bandwidth impacts to the SDN system by the service and resulting in a minimum remaining available bandwidth at the network device after attaching the service when more than one network device is selected to achieve the lowest bandwidth utilization at the SDN system by the service, wherein the calculation is to include a calculation a bandwidth utilization by the service at each available network device if the service is to be placed at the available network device.

10. The network device of claim 9, wherein the network bandwidth impact determinator is further configured to:
remove the service from the group of one or more services after selecting the network device for the service, and
select another service with the highest weight within the group for network device selection.

11. The network device of claim 9, further comprising a database, wherein the database stores one or more latency requirements, wherein the one or more latency requirements is to be associated with chains of services, and wherein selection of the network device for the service is to be further based on satisfying the latency requirement.

12. The network device of claim 9, further comprising a database, wherein the database stores one or more bandwidth capacity limitations, wherein each bandwidth capacity limitation is associated with a network device, and wherein selection of the network device for the service is further based not exceeding a bandwidth capacity limitation of the network device.

13. The network device of claim 9, further comprising a traffic flow interface configured to collect the bandwidth consumed by the one or more chains of service in which the service is included is during a time period.

14. The network device of claim 9, wherein each chain of services includes an ingress at the beginning of the chain and an egress at the end of the chain, and wherein each of the ingress and egress is a network device of the SDN system.

15. The network device of claim 9, wherein each bandwidth consumption entity of a service is a value of bandwidth consumption to or from an entry of the one or more chains of services that the service is included.

16. The network device of claim 11, the weight of a service is a sum of values of bandwidth consumptions of all bandwidth consumption entities of the service.

17. A non-transitory machine-readable storage medium having instructions stored therein, which when executed by a processor, cause the processor to perform operations in a network device serving as a software-defined networking (SDN) controller managing a plurality of network devices of a SDN system, wherein the SDN system offers a set of services, wherein a subset of the set of services is included in a chain of services for a subscriber, wherein an order of entries within the chain of services is defined, the operations comprising:
determining a list of bandwidth consumption entities of a service for each service within the set of services offered by the SDN system, wherein each bandwidth consumption entity is based on bandwidth consumed by one or more chains of services in which that service is included;
calculating a weight of each service based on the list of bandwidth consumption entities of the service;
selecting a service with the highest weight within a group of one or more services;
selecting a network device from the plurality of network devices managed by the SDN controller for the service based on at least partially on calculation of bandwidth impacts to the SDN system by the service and resulting in a minimum remaining available bandwidth at the network device after attaching the service when more than one network device is selected to achieve the lowest bandwidth utilization at the SDN system by the service, wherein the calculation includes a calculation of a bandwidth utilization by the service at each available network device if the service is to be placed at the available network device.

18. The non-transitory machine-readable storage medium of claim 17, wherein the operations further comprise:

removing the service from the group of one or more services after selecting the network device for the service; and selecting another service with the highest weight within the group for network device selection.

19. The non-transitory machine-readable storage medium of claim 17, wherein each bandwidth consumption entity of one service is a value of bandwidth consumption to or from an entry of the one or more chains of services in which the service is included.

* * * * *